Oct. 2, 1951  R. J. KOUPAL  2,570,132
FILTER
Filed Sept. 13, 1949
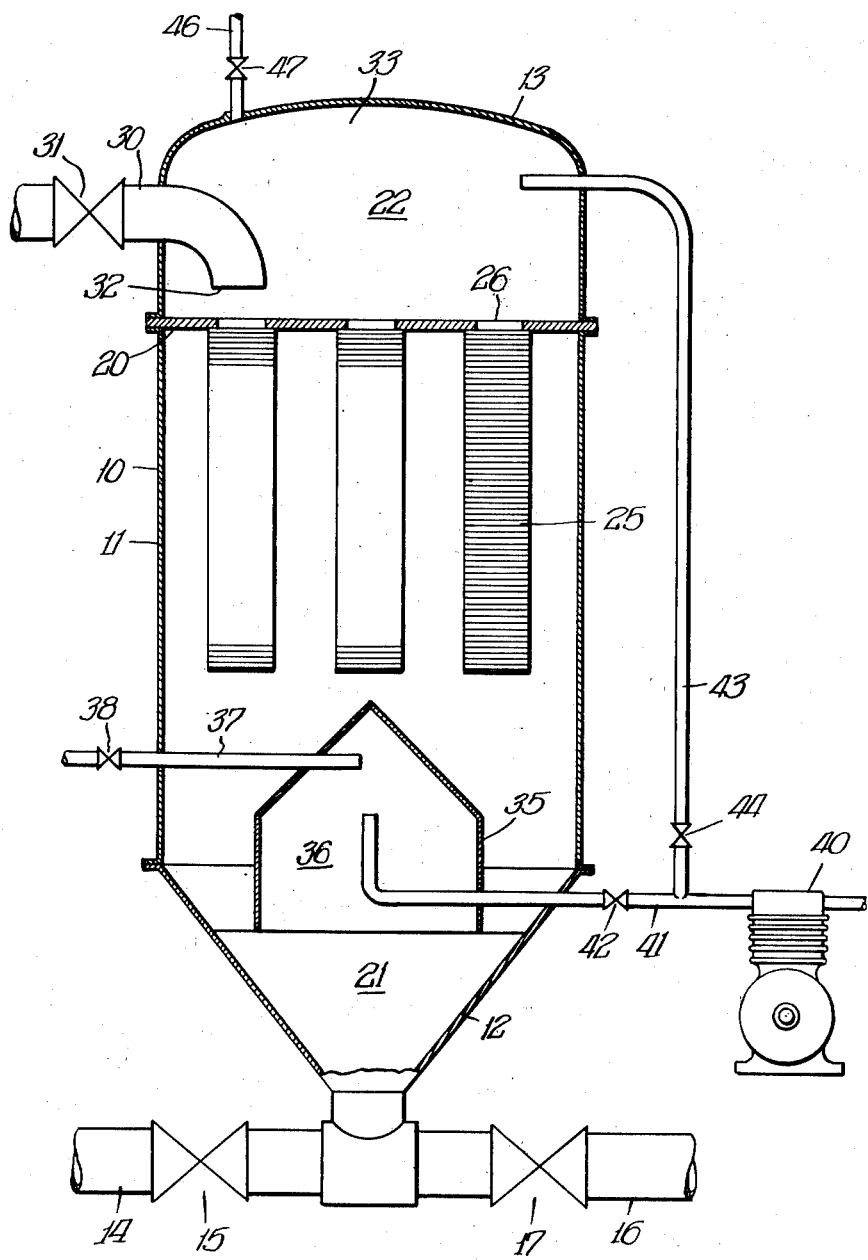
INVENTOR.
Robert J. Koupal,
BY
Agent Patented Oct. 2, 1951

2,570,132

UNITED STATES PATENT OFFICE 2,570,132

FILTER

Robert J. Koupal, Chicago, Ill., assignor to Infilco Incorporated, Chicago, Ill., a corporation of Delaware Application September 13, 1949, Serial No. 115,440

6 Claims. (Cl. 210—184)

This invention relates to filters of the type wherein the liquid is filtered through filter elements comprising filter beds of diatomaceous earth or similar material deposited on permeable rigid foundations. More particularly the invention relates to means for and methods of cleaning the filter elements of such a filter. Filters of this general type are sometimes referred to in the art as "diatomite filters" and will be so designated herein for simplification. However, it is to be understood that I do not wish to limit myself to any particular filter construction or filter material used therewith, but am using the term "diatomite filter" in a generic sense.

Once started, the filtering operation of a diatomite filter may be continued until, due to the solids retained, the porosity of the filter bed, or coat, drops below a predetermined value. Thereafter filtering is interrupted and the elements are cleaned. Various methods of cleaning the filter elements have been suggested, such as backwashing at various rates with a reversal of flow, sometimes aided by jets and/or streams of liquid along the outside of the elements.

More recently it has been suggested in Patent No. 2,423,172 that the removal of the dirty filter coat from the element and the cleaning of the rigid foundation may be effected by what has been designated in the art as an "air-bump wash." My invention relates to an improvement in this method and to apparatus suitable therefor.

It is an object of this invention to provide an improved apparatus for cleaning the filter elements of a diatomite filter which is more economical and simpler in construction and more reliable in operation.

Another object is to provide a diatomite filter equipped for air-bump wash which is smaller than conventional filters of this type for the same capacity.

Another object is to provide an apparatus and a method for cleaning a diatomite filter by a compressible fluid wherein the fluid is introduced into and stored in the filter in such manner as to prevent or minimize loss of the fluid during the filtering operation.

Another object is to provide a diatomite filter which can be "air-bump washed" by a fluid other than air.

These and other objects will become apparent upon consideration of the detailed description and the claims which follow.

In air-bump washing according to said Patent No. 2,423,172, air is trapped in the filter by the liquid flowing from the filter inlet to the filter outlet and is compressed under inlet pressure. One volume of air is compressed in the top portion of the filter and a second volume of air is compressed below the plate which supports the filter elements, the upper part of the elements being made impervious. A vent with a quick acting air release valve is provided which permits instantaneous escape of the second or release volume of air upon opening of the air release valve. As soon as the release air volume escapes from the filter, the operating air volume in the top of the filter expands and drives the water in the upper part of the filter and the elements outwardly through the elements at a high velocity.

This cleaning operation is very effective. However, in actual practice certain difficulties have been encountered. Thus, the plate which supports the elements must be very strong and the seals between the elements and the plate must be perfectly air tight to prevent the escape of the air volume trapped under the plate. In spite of careful construction this air volume has been lost at times during the filtering operation. It is therefore a specific object of my invention to improve the apparatus of Patent No. 2,423,172 and its operation to prevent loss of air and to permit a simpler and less costly construction.

I have found that loss of air can be avoided by providing a more suitable air storage space in the inlet chamber of the filter. Instead of the conventional air space under the supporting plate for the elements, I propose to mount in a suitable part of the inlet chamber a solid wall structure shaped to define a release air space. With the release air space thus located and formed by a solid wall, the construction of the filter is greatly simplified because the necessity of air tight seals between the filter elements and their supporting plate is eliminated. Further, the impervious upper portions of the filter elements may be omitted and the full length of the elements be used for filtering. This permits using shorter elements and consequently a lower casing with corresponding savings in cost.

In a preferred embodiment of the invention means are provided for introducing a part or all of the air for the air-bump washing step at the end of the filter run.

The invention will be more fully understood by reference to the drawing which shows a preferred embodiment of the invention.

The filter shown in the drawing comprises a casing or housing 10 of any convenient shape, but preferably the casing has a circular boundary wall 11, a hopper bottom 12, and a cover 13. An inlet conduit 14 equipped with an inlet valve 15 discharges into the bottom portion of the casing 10. A waste outlet 16 equipped with a waste valve 17 leads from the bottom portion of the casing 10. A plate or partition 20 extends horizontally across the casing and may be fastened to the casing by any suitable means, as by clamping its peripheral edge between the upper edge of the wall 11 and the lower edge of the cover 13. The plate 20 divides the housing into a lower inlet chamber 21 and an upper outlet chamber 22.

Depending on the size of the plant, one or more filter elements 25 are provided in the inlet chamber 21. These elements may be of any suitable type but are shown for purposes of illustration as being formed by helically wound wire windings around a cage of foraminous material as described in the patent to Paterson et al., No. 2,347,927. The elements are affixed to and supported by the plate 20 and for each element an opening 26 is provided in the plate 20 with which the element registers. Thus an open passageway is formed from the lower inlet chamber to the upper outlet chamber through the elements 25 and the openings 26. The elements 25 are pervious for their full length, so that the entire length of the elements is utilized for filtering. The seals (not shown) between the plate 20 and the elements 25 must be liquid tight but need not be air tight.

An outlet conduit 30 is provided with a valve 31. The intake 32 of the outlet conduit 30 is at an elevation which keeps the intake submerged in the liquid in the outlet chamber 22. This provides a space 33 under the cover 13 wherein air is trapped by the liquid rising to the outlet. Axially aligned in the filter intermediate the apex of the hopper bottom 12 and the lower end of the elements is a hood-like wall structure 35 forming an air release space 36. An air release conduit 37 provided with a quick acting valve 38 leads from an upper portion of the space 36 under the hood 35 to outside the casing 10. The hood 35 may have any suitable shape, but its walls should be relatively steep to prevent deposit of solids thereon.

An air compressor 40 is provided with its discharge connected to the space 36 under the hood 35 by a line 41 provided with a valve 42. The compressor discharge is also connected to the upper portion of the outlet chamber 22 by a line 43 provided with a valve 44. A vent 46 is shown leading through the cap 13 and is provided with a valve 47.

The washing of the elements of the filter may be carried out in the conventional air-bump manner. In this case the vent 46 is not needed. Liquid to be filtered entering through the inlet 14 and rising in the inlet chamber 21 will trap air under the hood 35 and compress it in the air space 36 under inlet pressure. Likewise, air will be trapped and compressed in air space 33 under the cover 13 as in the conventional apparatus. At the end of the filter run the quick acting air release valve 38 is opened, whereby the air trapped under the hood 35 is instantly released and the air trapped under the cover 13 is thus enabled to expand and force the liquid in the outlet chamber and elements downward and outward through the elements, thus washing off the filter beds and dirt accumulations and at the same time cleaning the fine openings of the rigid foundations.

In this method of operation, air will be safely stored in the upper portion of the air space 36 under the hood, but a certain amount of air may escape from the lower part of the space 33 which is in contact with the flowing liquid. To provide for the full amount of release air by trapping of air necessitates therefore a rather deep hood. Since the elements in my apparatus do not need an impervious upper portion and are therefore shorter than the elements commonly used in the air-bump wash, sufficient space is available below the elements for a relatively deep hood. However, ordinarily it is preferable to take advantage of the reduced length of the elements to cut down on the overall height of the apparatus. To provide for sufficient air under a relatively small hood, compressed air from the compressor 40 is admitted through line 41 toward the end of the filter run. Compresesd air may also be introduced into the air space 33 under the cover 13, through line 43, although generally this will not be necessary.

In another and preferred manner of operation, especially for large filters, the air for washing is not trapped and stored in the filter, but is introduced at the end of the filter run. When the filter is first filled with liquid after it has been drained, the outlet valve 31 remains closed and the air release valve 38 and the vent valve 47 are open until the liquid has reached their respective levels and displaced the air from the space 36 under the hood and the space 33 under the cap 13. The filter is thus substantially completely filled with liquid during filtering. At the end of the filter run, the inlet valve 15 is closed and the outlet valve 31 is left open and the compressor 40 is operated. Air under pressure is then forced into the two air spaces 36 and 33, displacing the liquid therefrom through the open outlet 30. When the air spaces are filled with air under pressure, the outlet valve 31 is closed, and the compressor 40 turned off. Then the air release valve 38 is opened and the air-bump wash proceeds thereafter as described above.

This method of operation has the advantage that washing need not be carried out by compressed air. Sometimes the contact of the liquid to be filtered with air during filtering and the presence of air in the filtered liquid is undesirable. In such cases any other suitable compressible fluid can be introduced into the filter by the compressor.

It will be seen that the new apparatus and method for carrying out air-bump wash permits considerable simplification of the construction and reduction of size of the apparatus, with corresponding saving in cost, at the same time the operation is more reliable.

Many modifications coming within the scope of the invention will be obvious to those skilled in the art. Accordingly, it will be understood that I do not wish to limit myself to the exact structure shown and described for purposes of exemplification and illustration.

I claim:

1. In a diatomite filter including a casing, a partition in said casing separating therein an inlet chamber from an outlet chamber, a filter element supported by said partition, a passageway through said partition registering with said filter element, an outlet from an elevation in said outlet chamber adjacent said partition, an inlet discharging into said inlet chamber and a drain leading from said inlet chamber, wall means mounted in said inlet chamber and forming therein an air chamber having a closed top spaced below said partition and an open bottom through which said chamber is in open communication with the liquid in said inlet chamber, a vent leading from said air chamber to outside said filter, and a quick acting valve on said vent.

2. In a diatomite filter comprising a casing, a plate across said casing separating a lower inlet chamber from an upper outlet chamber, a passageway through said plate, a filter element mounted on said plate and registering with said passageway, an inlet into the lower portion of said inlet chamber, an outlet leading from said outlet chamber, and a waste outlet leading from said inlet chamber, an air chamber mounted in said inlet chamber at a lower level than said plate, said air chamber having a vertical boundary wall and a top wall, and being in open communication with the liquid in said inlet chamber through its bottom, an air release conduit leading from said air chamber, a valve on said air release conduit, and means for introducing air under pressure into said air chamber.

3. The apparatus of claim 2, comprising also means for introducing air under pressure into the upper portion of said outlet chamber.

4. In a diatomite filter comprising a casing, a partition across said casing separating a lower inlet chamber from an upper outlet chamber, a passageway through said partition, an inlet into the lower part of said inlet chamber, an outlet from said outlet chamber, the intake of said outlet being substantially spaced from the top of said outlet chamber, and a drain from the lower portion of said casing, a filter element having a permeable wall, said permeable wall being fixed to said partition in liquid tight relationship and in such manner as to register with said passageway, a hood-like wall in said inlet chamber spaced below said filter element and above said inlet, an outlet conduit from the space under said hood to outside said casing, a valve on said outlet conduit, a gas inlet conduit discharging under said hood, a second gas inlet conduit discharging into the upper portion of said outlet chamber, and a compressor connected to said gas inlet conduits.

5. The apparatus of claim 4 including also a vent through the top of said outlet chamber and a valve on said vent.

6. In a diatomite filter comprising a casing, a plate across said casing separating a lower inlet chamber from an upper outlet chamber, a passageway through said plate, a filter element mounted on said plate and registering with said passageway, an inlet into the lower portion of said inlet chamber, an outlet leading from said outlet chamber, a partition structure mounted in said inlet chamber at a lower level than said plate and forming a closed top, open bottom chamber within said inlet chamber which is in open communication with the liquid in said inlet chamber through its open bottom, a conduit leading from the chamber within said partition structure to outside the filter, a valve on said conduit, and means for introducing gas under pressure into said last mentioned chamber.

ROBERT J. KOUPAL.

REFERENCES CITED

The following references are of record in the file of this patent:

UNITED STATES PATENTS

| Number | Name | Date |
|---|---|---|
| 1,015,051 | Martin | Jan. 16, 1912 |
| 1,794,841 | Elfreth | Mar. 3, 1931 |
| 2,423,172 | Booth | July 1, 1947 |